United States Patent Office 3,531,160
Patented Sept. 29, 1970

3,531,160
PRODUCTION OF SOUR GAS-SULFUR WELLS
EMPLOYING A SULFUR SOLVENT
Henry B. Fisher, Bartlesville, Okla., assignor to Phillips Petroleum Company, a corporation of Delaware
No Drawing. Filed Sept. 18, 1968, Ser. No. 760,705
Int. Cl. E21b 21/00, 43/28
U.S. Cl. 299—5                                      6 Claims

ABSTRACT OF THE DISCLOSURE

Elemental sulfur is removed from a sour gas-sulfur well by circulating into and from the well a liquid alkyl sulfide and/or a liquid alkyl disulfide. N-butyl sulfide, di-tert-butyl disulfide, and polysulfides are solvents useful in sour gas-sulfur production to remove sulfur which otherwise may cause plugging problems. Sulfur dissolved in polysulfides employed can be recovered by contacting the used solvent with a low boiling solvent such as ketone or hydrocarbon, e.g., acetone, pentane, hexane. The recovered organic sulfur compound can be reused for recovery of further sulfur. Sulfur dissolved in n-butyl sufide or di-tert-butyl disulfide is recovered by a distillation or other process.

---

This invention relates to the production of sour gas-sulfur wells. It also relates to the removal of elemental sulfur from such wells. Further, it relates to the production of elemental sulfur from such wells. Still further it relates to the periodic treatment of such wells to avoid sulfur plugging problems.

According to a concept of the present invention, it provides for the circulation into and from a sour gas-sulfur well of a liquid alkyl sulfide and/or a liquid alkyl disulfide. According to another concept of the invention it provides for the recovery from the sulfide and/or disulfide employed of elemental sulfur dissolved therein by distillation or other treatment. The sulfur can be recovered from polysulfide by treatment of the used solvent with low-boiling solvent, for example, a ketone and/or low-boiling hydrocarbon, e.g., acetone, pentane, hexane, etc. According to a further concept still, the invention provides, in the production of a sour gas-sulfur well, for a periodic pumping into, through and from the well of a high-boiling organic sulfur solvent for removal of elemental sulfur from the well. In another concept of the invention, it provides a method for the recovery of sulfur from a well by pumping thereinto and therefrom a high-boiling oganic sulfur compound, e.g., an organic sulfide or disulfide followed by distillation or other treatment. The sulfur dissolved in polysulfides is recovered by treatment of the used solvent with a low-boiling solvent such as a ketone and/or a low-boiling hydrocarbon.

The problems of sulfur plugging in gas wells is set out in "The Oil and Gas Journal," Apr. 17, 1967, page 113. In the article, a high-boiling, paraffin-base mineral oil is used to dissolve the precipitated sulfur in the well before accumulation reaches harmful proportions. The problem of sulfur clogging in a hydrogen sulfide gas well is set forth in "The Oil and Gas Journal," Apr. 1, 1968, page 80. A new process there disclosed and which forms the subject matter of another application for patent involves circulating benzene into the well. The present invention relates to and is especially applicable for the production of such wells as are described in the latter "Oil and Gas Journal" article, the information of which is incorporated herein by reference. U.S. Pat. 3,223,156, issued Dec. 14, 1965, discloses the use of a gas for preventing sulfur deposit in riser pipes in the extraction of natural gases laden with hydrogen sulfide when elementary sulfur is present in the deposit. U.S. Pat. 3,375,192, issued Mar. 26, 1968, discloses a method for cleaning oil and gas wells employing carbon disulfide-pentane mixtures. U.S. Pat. 3,376,931, issued Apr. 9, 1968, discloses a treating through a well, petroleum-producing formation containing hydrogen sulfide gas and elemental sulfur by the introduction of an aqueous solution of a material which will dissolve the free sulfur, i.e., an ammonium sulfide.

I have now conceived of a method for producing a sour gas-sulfur well. My method is based upon the concept that liquid alkyl sulfides and liquid alkyl disulfides will act as sulfur solvents in the production of such wells. The organic sulfides can be used periodically or continuously, depending upon results which can be obtained by their utilization. I have also conceived that the sulfur dissolved in the organic sulfide solvents thus used can be recovered by contacting the used solvents with a low boiling solvent, e.g., a ketone and/or a hydrocarbon, for example, acetone, pentane, hexane, etc. Still further, I have conceived that my organic sulfur solvents can be used intermittently as replacement for other solvents which are being used or together therewith.

An object of this invention is to provide a method for producing a sour gas-sulfur well. Another object of this invention is to provide a solvent for use in production of such a well. A still further object of the invention is to avoid sulfur plugging in sour gas-sulfur wells. In a further object of the invention a process for recovering sulfur from the used organic sulfur solvent is provided. A further object of the invention is to provide solvents for utilization in the production of such a well, as here described, which can be used intermittently or continuously or even alternately with other solvents.

Other aspects, concepts and objects of this invention are apparent from a study of this disclosure and the claims.

According to the present invention a sour gas-sulfur well is treated with a liquid alkyl sulfide and/or with a liquid alkyl disulfide to remove elemental sulfur therefrom.

I have also discovered that in spite of the reported reactivity of sulfur with alkyl sulfides and alkyl disulfides that it is possible to use the sulfides as solvent for removal of sulfur from sour gas-sulfur wells. Indeed, I have found that sulfur-reacted sulfides and disulfides can also be used and that the sulfur-reacted disulfide has a higher capacity for dissolving sulfur than has the unreacted disulfide. This unexpected discovery lends additional value to the invention.

The sulfur-reacted disulfide has a higher capacity for sulfur dissolution than the disulfide before it has been reacted with the sulfur.

The solubility of sulfur in n-butyl sulfide was measured as a function of temperature in order to evaluate this solvent as an alternative for benzene in keeping $H_2S$-sulfur wells from plugging. It is a low viscosity liquid with a boiling point of 360° F. The relatively low vapor pressure of this material (compared to benzene) at ambient temperature has obvious advantages in a solvent recovery system.

The solubility of sulfur in n-butyl sulfide was found to be a linear function of the temperature from 75° F. to 225° F. when plotted on semi-log paper. Solubilities measured at 253° F. and 312° F. were lower than would be given by straight line extrapolation of the lower temperature data. It appears that the deviation probably develops at temperatures above the melting point of sulfur (246° F. for rhombic sulfur). Di-tert-butyl disulfide was also tested for use in this application.

In connection with the problem of producing sour gas-sulfur wells, tests were made to determine the applicability of n-butyl sulfide and di-tert-butyl disulfide as sulfur routine tests. Compounds included among those now contemplated are contained in Table I.

TABLE I

| | | B.P. range (° F.) of impure products | Approximate flash point, ° F. | Density, lbs./gal. |
|---|---|---|---|---|
| Diethyl sulfide | $CH_3CH_2 \cdot S \cdot CH_2CH_3$ | 169–203(198) | 15 | 7.01 |
| Di-normal propyl sulfide | $C_3H_5$—$S$—$C_3H_8$ | 282–289(289) | 90 | 6.99 |
| Di-tertiary butyl sulfide | $(CH_3)_3 \cdot C \cdot S \cdot C \cdot (CH_3)_3$ | 297–303 | 125 | 6.92 |
| Di-normal butyl sulfide | $C_4H_9 \cdot S \cdot C_4H_9$ | 369–376(360) | 140 | 6.98 |
| Ethyl thioethanol | $C_2H_5 \cdot S \cdot C_2H_2OH$ | 356–363 | | 8.43 |
| Diphenyl ethyl sulfide | $(C_6H_5 \cdot C_2H_4)_2 \cdot S$ | 568–658 | | 8.68 |
| Diethyl disulfide | $C_2H_5 \cdot S \cdot S — C_2H_5$ | 299–304(309) | 120 | 8.31 |
| Di-normal propyl disulfide | $C_3H_7 \cdot S \cdot S — C_3H_7$ | 374–390(383) | 155 | 8.00 |
| Di-tertiary butyl disulfide | $(CH_3)_3 \cdot C \cdot S \cdot S \cdot C \cdot (CH_3)_3$ | 375–405(392) | 175 | 7.74 |
| Di-normal butyl disulfide | $C_4H_9 \cdot S \cdot S \cdot C_4H_9$ | 439–462 | 200 | 7.84 |
| Di-tertiary amyl disulfide | $(C_2H_5(CH_3)_2 \cdot C \cdot S)_2$ | 440–478 | 220 | 7.75 |
| Di-tertiary hexyl disulfide | $(t-C_6H_{13} \cdot S)_2$ | 458–552 | 240 | 7.89 |
| Di-tertiary heptyl disulfide | $(t-C_7H_{15} \cdot S)_2$ | 327–597 | 135 | 7.82 |
| Di-tertiary octyl disulfide | $(t-C_8H_{17} \cdot S)_2$ | 579–602 | 285 | 7.70 |
| Di-tertiary dodecyl disulfide | $(t-C_{12}H_{25} \cdot S)_2$ | 611–685 | 245 | 7.70 |
| Di-tertiary tetradecyl disulfide | $(t-C_{14}H_{29} \cdot S)_2$ | 490–691 | 240 | 7.68 |
| Di-tertiary butyl poly sulfide | $(CH_3)_3 \cdot C \cdot S_x \cdot C(CH_3)_3$ | >421 | 185 | 9.78 |
| Di-tertiary amyl poly sulfide | $C_2H_5(CH_3)_2 \cdot C \cdot S_x \cdot C(CH_3)_2C_2H_5$ | >463 | 220 | 9.48 |
| Di-tertiary octyl poly sulfide | $t-C_8H_{17} \cdot S_x \cdot t-C_8H_{17}$ | >646 | 330 | 8.96 |
| Di-tertiary dodecyl poly sulfide | $tC_{12}H_{25}S_x \cdot t-C_{12}H_{25}$ | >691 | 405 | 8.80 | solvents for circulating through such wells. Comparing the following sulfur solubility data for a well head temperature of 150° F., n-butyl sulfide is shown to have about the same capacity for elemental sulfur as a light cycle oil (LCO) while di-tert-butyl disulfide is more comparable to a diesel oil. In addition, a prepared sample of sulfur-reacted disulfide approached the capacity of benzene.

The suitability of any particular solvent selected can be determined by mere routine test. Suffice to say, the concept of the invention for the sulfur removal part thereof is based upon the finding that the organic sulfides mentioned do effectively dissolve sulfur in the well, albeit there may be some reaction and further upon the fact that there is not that much reaction as to make it impossible or prohibitive to use the named materials as

| | Lbs. Elementary Sulfur in Solution per Bbl. Solvent | | | | | |
|---|---|---|---|---|---|---|
| | Benzene | Gulf LCO | Sweeny LCO | Diesel oil | n-Butyl sulfide | Di-tert-butyl disulfide | Sulfur reacted disulfide |
| Temp.: ° F. | | | | | | | |
| 75 | 6.5 | [1] 6 | [1] 5.3 | 2 | 4 | 2.5 | [1] 15.5 |
| 150 | 22.8 | 16 | 15 | 8 | 14 | 9.7 | 21 |
| 200 | 53.2 | 45 | 35 | 20 | 34 | 22 | 42 |
| 250 | 120 | 115 | 79 | 37 | 65 | 41 | 82 |
| 300 | | 187 | | 57 | 86 | 63 | |

[1] Reservations are held on the accuracy of these figures.

As noted, sulfur reacts with the organic sulfides and disulfides at higher temperatures. The reaction appears to be initiated around 260° F. and cannot be considered a fast reaction even at 340–350° F. At 300° F. it was determined that the reaction rate of sulfur is higher with the disulfide than with the sulfide. The elemental sulfur dissolving capacity of the sulfur-reacted disulfide is much higher than for the unreacted disulfide while the sulfur-reacted sulfide and the unreacted sulfide are judged to be about equivalent. Evidence was obtained that the dissolved sulfur present in a sulfur-reacted di-tert-butyl disulfide could be precipitated by mixing the solvent with acetone, pentane, or hexane.

Both n-butyl sulfide and di-tert-butyl disulfide are low viscosity liquids with boiling points of about 360° F. and are available from certain refinery operations. The reactivity with sulfur may cause some loss of elemental sulfur from a fairly hot well but not such a loss as to preclude use of the solvent of this invention. Normal butyl sulfide and di-tertiary butyl disulfide are used as such in lower temperature (<250° F.) wells. Products react slowly with sulfur at temperature >250° F. The sulfur reacted ditertiary butyl disulfide (a polysulfide) is unique in having a high capacity for dissolving sulfur and it is this excess sulfur which can be precipitated by acetone, pentane, or hexane.

Although n-butyl sulfide and di-tert-butyl disulfide have been specifically named above, other sulfides and disulfides can be used. Suitability of any particular organic sulfur chemical as solvent can be determined by mere solvents. Further, the invention is also based upon the concept that sulfur can be recovered from the solvents used. Ketones and hydrocarbons or other solvents which can be applied to recover elemental sulfur from the organic sulfide solvents used can be determined by mere routine test.

The invention is also based upon the concept that the sulfur-reacted disulfides have a better solvency for elemental sulfur than do the unreacted disulfides.

The reaction of sulfur with alkyl sulfides and alkyl disulfides at elevated temperatures is found in "Mechanisms of Sulfur Reactions" by W. A. Pryor, McGraw-Hill Book Company, Inc., 1962.

EXAMPLE

In the sulfur producing Josephine A–1 well in Perry County, Miss., gas flows at approximately 30 MM cubic feet per day. The bottom hole pressure at maximum flow rate is about 9000 p.s.i.g. and well head pressure is about 6200 p.s.i. The gas contains about 2000 pounds of sulfur per MM cubic foot of gas at a bottom hole temperature of about 350° F. The well depth is 20,127 feet with two producing zones in the interval between 19,777 and 19,979 feet. The well head temperature is 150° F. Solvent, such as alkyl sulfide or disulfide is injected at the well head temperature through a separate tubing extending to near the bottom of the well where it mixes with the produced gas. Since the solubility of sulfur in n-butyl sulfide at 150° F. (well head temperature) is 14 pounds per barrel, 4,280 barrels of n-butyl sulfide (60,000/14) are used per day. The sulfur is recovered from the solvent at the surface by distillation with the solvent being recirculated. When polysulfides are circulated the sufur is precipitated with acetone, pentane, or hexane and recovered, with solvent being recirculated.

Reasonable variation and modification are possible within the scope of the foregoing disclosure, and the appended claims to the invention the essence of which is that there have been provided methods for removing elemental sulfur from a sour gas-sulfur well by circulating therethrough at least one of a liquid alkyl sulfide and a liquid disulfide.

I claim:

1. A method for removing and recovering elemental sulfur from a sour gas-sulfur well which comprises circulating into and from said well at least one of a liquid alkyl sulfide and a liquid alkyl disulfide.

2. A method according to claim 1 which comprises passing into the well as said disulfide for dissolving elemental sulfur therein an earlier sulfur-reacted disulfide.

3. A method according to claim 2 wherein the earlier sulfur-reacted disulfide is di-tertiary-butyl disulfide.

4. A method according to claim 1 wherein the alkyl sulfide is di-n-butyl sulfide and the disulfide is di-tertiary-butyl disulfide.

5. A method for removing and recovering elemental sulfur from a sour gas-sulfur well which comprises circulating into and from said well at least one of a liquid alkyl sulfide and a liquid alkyl disulfide, and treating the elemental sulfur containing liquid thus obtained to recover sulfur therefrom by contacting the same with at least one of a low-boiling ketone and a low-boiling hydrocarbon thus to cause separation of the dissolved sulfur.

6. A method for removing and recovering elemental sulfur from a sour gas-sulfur well in which the bottom hole temperature is at about 350° F. and the well head temperature is about 150° F. which comprises circulating into and from said well at least one of a liquid alkyl sulfide and a liquid alkyl disulfide.

References Cited

UNITED STATES PATENTS

| 2,768,929 | 10/1956 | Capell et al. | 208—240 |
| 3,070,162 | 12/1962 | Barnard | 166—312 X |
| 3,375,192 | 3/1968 | Rowlinson | 252—364 X |
| 3,376,931 | 4/1968 | Messenger | 166—307 |
| 3,393,733 | 7/1968 | Kuo et al. | 299—5 X |

OTHER REFERENCES

Sulfur Plugging Whipped in Gas Wells, Oil & Gas J., Apr. 17, 1967, pp. 113–114.

ERNEST R. PURSER, Primary Examiner

I. A. CALVERT, Assistant Examiner

U.S. Cl. X.R.

166—267, 312; 299—7